Patented June 13, 1933

1,913,791

UNITED STATES PATENT OFFICE

JOHN N. CAROTHERS, OF ANNISTON, ALABAMA, ASSIGNOR TO SWANN RESEARCH, INCORPORATED, A CORPORATION OF ALABAMA

PROCESS OF MAKING A FERTILIZER

No Drawing. Application filed April 21, 1930. Serial No. 446,193.

This invention relates to a process of making a fertilizer, and in particular to a process of treating calcium superphosphate, or equivalent compounds.

The object of this invention is to provide a process for the more efficient utilization of the sulphuric acid which is ordinarily used in treating phosphate rock when producing superphosphate.

A further object of this invention is to provide a process by which dicalcium phosphate and ammonium salts may be economically prepared.

A still further object is to provide a process for economically utilizing ammonium carbonate in solution, or when present, in by-product gases as mixtures of ammonia and carbon dioxide, such as are obtained during the synthesis of urea from ammonia and carbon dioxide.

The product produced by my process may be used directly as a fertilizer or as an ingredient of mixed fertilizers. It may be separated into two parts by leaching with water so as to give an insoluble constituent consisting of calcium carbonate and dicalcium phosphate and a soluble portion consisting of ammonium sulphate and diammonium phosphate.

It is already well known that superphosphate may be treated with ammonia and a mixture of dicalcium phosphate, ammonium sulphate and calcium sulphate obtained. This reaction may be written:

1. 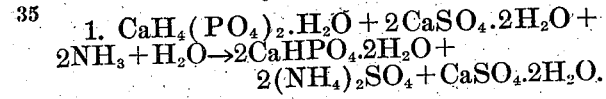
$2NH_3 + H_2O \rightarrow 2CaHPO_4.2H_2O + 2(NH_4)_2SO_4 + CaSO_4.2H_2O$.

Superphosphate also sometimes known as "acid phosphate" is made by treating bone phosphate of lime or phosphate rock with sulphuric acid. It consists essentially of monocalcium phosphate and calcium sulphate in the proportions of one molecular weight of the former to two molecular weights of the latter.

I have found that reaction 1 above may be carried out more effectively, and with a greater utilization of the sulphuric acid by the addition of carbonic acid. Carbonic acid or even carbon dioxide gas may be used, the latter being combined with the ammonia entering into the reaction. I have found that in operating in my preferred manner I cause less reversion to take place than when the reaction is carried out in the usual way.

In operating my improved process one thus obtains a greater utilization of ammonia without causing "reversion" of the available phosphate to take place. By "reversion" is meant the production during treatment or afterwards of phosphates which are neither water soluble nor ammonium citrate soluble.

The products obtained by my process are mixtures of dicalcium phosphate and calcium carbonate, insoluble in water, and ammonium sulphate and diammonium phosphate, the latter two substances being water soluble. A separation may be made in the usual way if desired.

When operating my improved process I prefer to take a mixture of monocalcium phosphate and calcium sulphate in the proportion of one molecular weight of the former to two molecular weights of the latter and treat them with a solution of ammonium carbonate at ordinary or slightly elevated temperatures. The solution preferably contains about 2.5 gram formula weights of ammonium carbonate per liter of water. In place of a mixture of monocalcium phosphate and calcium sulphate, I may employ the mixture ordinarily known as superphosphate or "acid phosphate" which contains the above substances in the proper proportion. The reaction which takes place may be written:

2. 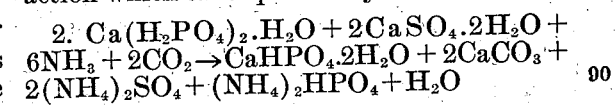
$6NH_3 + 2CO_2 \rightarrow CaHPO_4.2H_2O + 2CaCO_3 + 2(NH_4)_2SO_4 + (NH_4)_2HPO_4 + H_2O$ The aqueous mixture which is obtained as above may now be dried at a low temperature to give a mixture of dicalcium phosphate, calcium carbonate, ammonium sulphate and diammonium phosphate. The product thus obtained may serve as a fertilizer. By drying at a higher temperature, it is possible to convert the diammonium phosphate into monoammonium phosphate and ammonia, the latter being recovered and reused in the process.

Instead of using solutions of ammonium carbonate, the treatment may be carried out as above, using ammonia water of the proper equivalent strength and carbon dioxide gas or gases containing carbon dioxide passed through the solutions, thus building up a carbonate concentration during treatment. The proportion of carbon dioxide to ammonia may be as indicated in the above reaction, or it may be present in a greater amount.

After treatment as above, the insoluble substances may be separated from the soluble salts in the reaction products by known means. The insoluble calcium carbonate and dicalcium phosphate may be used as a fertilizer ingredient, or for various chemical purposes. The soluble salts may be recovered by drying or by evaporation and crystallization, either as a mixture of ammonium sulphate and diammonium phosphate, or after evaporation at a higher temperature as ammonium sulphate and monoammonium phosphate. These substances are suitable as fertilizers or for other chemical purposes.

What I claim is:

Process for producing a mixture of dicalcium phosphate and ammonium salts from a mixture of monocalcium phosphate and calcium sulfate comprising reacting said monocalcium phosphate and calcium sulphate together with a solution containing six moles of ammonia and two moles of carbon dioxide for each molecule of $P_2O_5$ to be reacted upon, drying the resulting mixture at a temperature sufficiently high to convert the diammonium phosphate in the mixture to monoammonium phosphate, and recovering the ammonia driven off in drying for reuse in the said solution.

In testimony whereof I affix my signature.

JOHN N. CAROTHERS.